United States Patent [19]
Ferreira et al.

[11] Patent Number: 5,507,369
[45] Date of Patent: Apr. 16, 1996

[54] REACTION DEAM DISC BRAKE WITH SLIDING PINS FOR VEHICLES

[75] Inventors: Alexandre C. Ferreira; Antonio E. deMorais, both of Sao Paulo, Brazil

[73] Assignee: Freios Varga Ltda. S/A, Sao Paulo, Brazil

[21] Appl. No.: 215,180

[22] Filed: Mar. 21, 1994

[30] Foreign Application Priority Data

Mar. 28, 1993 [BR] Brazil .................................. 9300877

[51] Int. Cl.$^6$ .................................................. F16D 65/02
[52] U.S. Cl. ..................... 188/73.45; 188/219.1
[58] Field of Search ............................ 188/73.45, 73.44, 188/72.3, 71.6, 73.35, 73.36, 73.37, 219.1

[56] References Cited

U.S. PATENT DOCUMENTS

| | | | |
|---|---|---|---|
| 4,223,764 | 9/1980 | Flotow | 188/72.3 |
| 4,392,560 | 7/1983 | Nakasu et al. | 188/73.45 |
| 4,741,419 | 5/1988 | Rath | 188/73.45 |
| 4,846,312 | 7/1989 | Sweetmore et al. | 188/73.37 |
| 4,854,423 | 8/1989 | Evans et al. | 188/73.45 |
| 5,111,915 | 5/1992 | Rupprecht | 188/73.45 |
| 5,188,202 | 2/1993 | Terashima | 188/73.45 |

FOREIGN PATENT DOCUMENTS 2074265  10/1991  United Kingdom .................. 188/71.6

Primary Examiner—Matthew C. Graham
Attorney, Agent, or Firm—Kuhn and Muller

[57] ABSTRACT

A reaction beam disc brake with sliding pins is provided for vehicles, wherein the disc brake eliminates the residual torque, and sensibly reduces the manufacturing stages. The compression effort of the pads on the disc occurs at the piston central line and at the same plane of the sliding and reaction pins. The disc brake includes a piston (1), a removable inner pad (3), a beam shape outer pad (4), two sliding pins (5), a carrier (2) and four springs to move away the pads (3)(4), which are mounted on the sliding pins (5).

1 Claim, 3 Drawing Sheets

FIG. I

REACTION DEAM DISC BRAKE WITH SLIDING PINS FOR VEHICLES

BACKGROUND OF THE INVENTION

The present report deals with the detailed description accompanied of elucidative drawings of an advanced disc brake for automobile vehicle, mainly small vehicles. For its unusual and novel special configuration, the disc brake of the present invention is an extremely efficient and economic assembly whose simplicity of manufacturing results in easy installation and maintenance.

SUMMARY OF THE INVENTION

The brake disc herein described basically consists of a piston housing, a reaction carrier with central bracket brake pads and sliding pins, as any disc brake commercially available.

What is innovative in the present invention is that its special configuration provides for the compression effort of the pas on the disc to occur in the piston central line, and in the same plane of the sliding and reaction pins, so that the braking force is equally and evenly distributed between the two brackets of the pads' carrier at the central area, and is symmetrically distributed onto the sliding pins.

That is, the whole action and reaction force of the brake acts on the same plane, which is the brake medium plane, comprising the piston and the sliding pin central line, and the tangent resultant from the braking, which acts on the radial center of the breaking path, where the braking tangential resulting from the disc pads' compression effort is symmetrically loaded on the sliding pins by the inner and outer pads.

OBJECTS OF THE INVENTION

Such a disc brake of the present invention is specially developed for aiming at the simplification of the productive process, having easily adaptable parts to improve the vehicle versatility. The disc brake of the present invention also reduces the problems created by residual torque, as in the conventional existing disc brake projects; wherein the calipers have problems of force distribution, which require a more robust structure, and therefore, many stages of manufacturing, leading to increased cost. The same displacement causes noise and considerable residual torque due to the incorporation of elements to eliminate such noise.

This new disc brake, with its novel physical and mechanical conception and its special configuration, has several advantages, such as the considerable increase of the material area of the pad friction, and reduction and simplification of the number of manufacturing stages. Thus becoming less costly, it reduces the number of parts and components due to its simple configuration.

Its lightness provides for flexibility of dimensions and the use of alternative materials. It also provides for the variation of the piston diameter at a range of dimension up to 57 mm. It may be used to function with ventilated discs and or for solid discs without altering the main project.

For the flexible constructive variation the system can easily house the parking brake mechanism and the carrier bracket and the sliding system of the pads reduces the noise to zero. The compression ring acting on the pads reduces the residual torque to zero. The sealed sliding pins reduce the sliding force, and the pins put into a single plane any efforts and reactions which reduce deflections and contribute to avoid residual torque, to increase the pads' useful life and to contribute to reduce the vehicle fuel consumption.

All braking efforts of the disc brake of the present invention are always equally distributed between the two sides of the brake bracket and allow a more light construction, which can be less reinforced and structured.

DESCRIPTION OF THE DRAWINGS

The present invention can best be understood by the descriptive specification of the present invention, when read in conjunction with the drawings, in which.

DETAILED DESCRIPTION OF THE DRAWINGS

Figure 1:
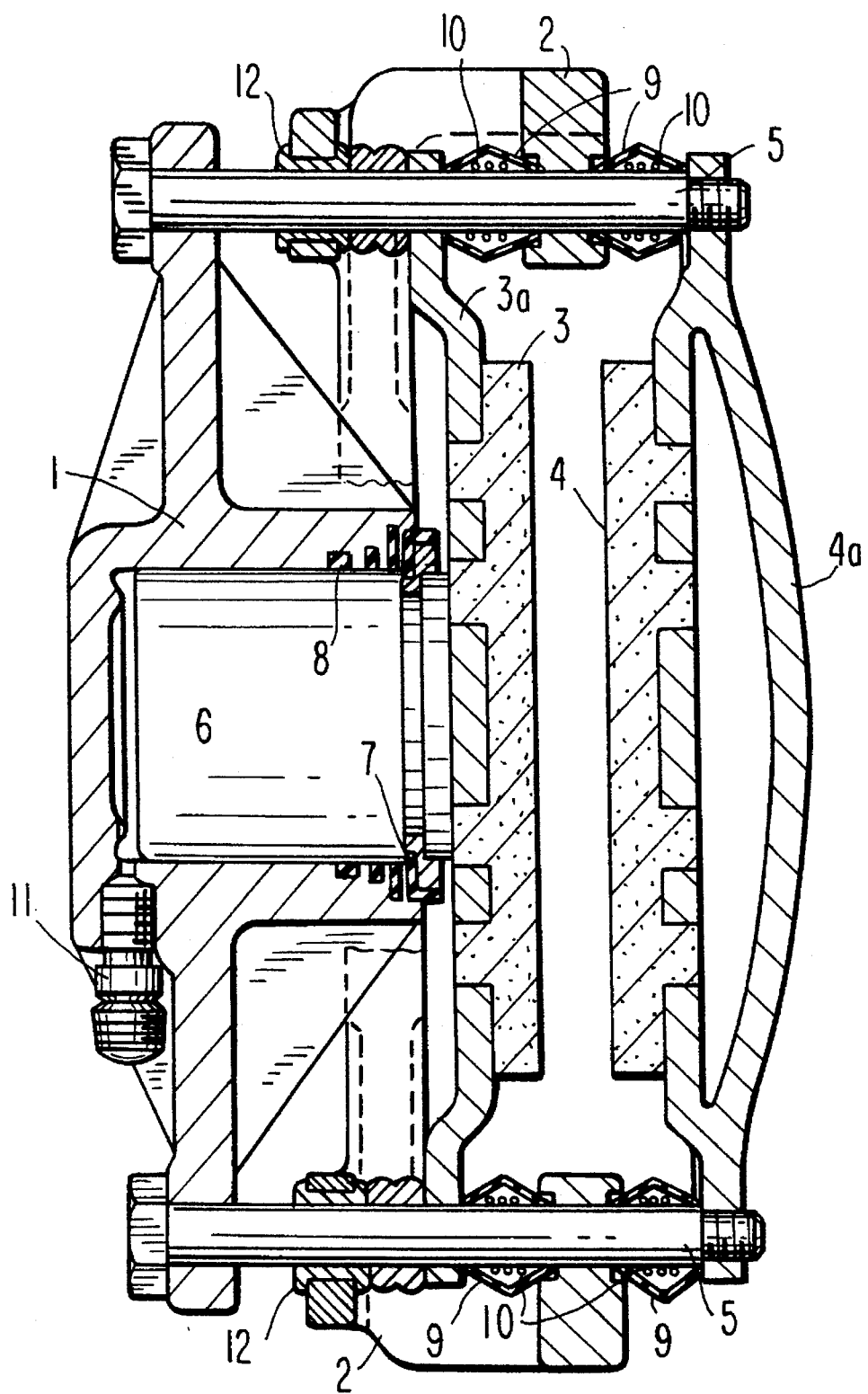
FIG. 1 is a side vertical view of the disc brake.
Figure 2:
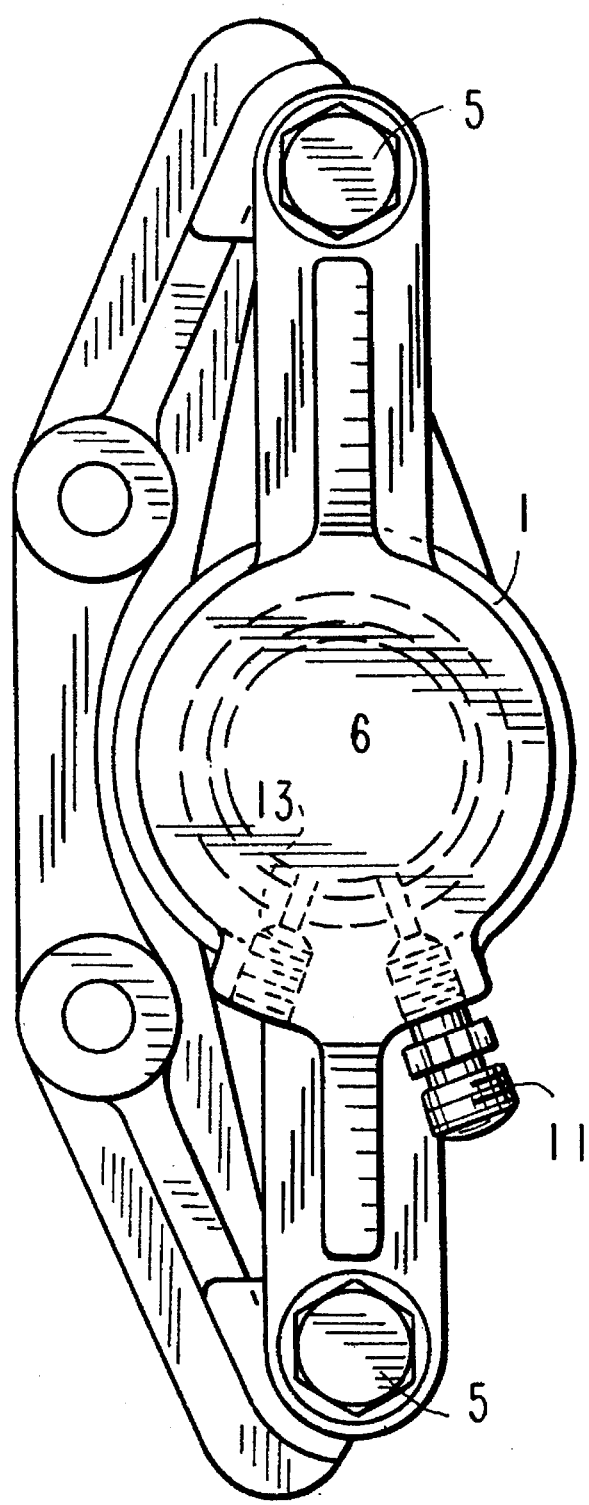
FIG. 2 is a view of the disc brake front.
Figure 3:
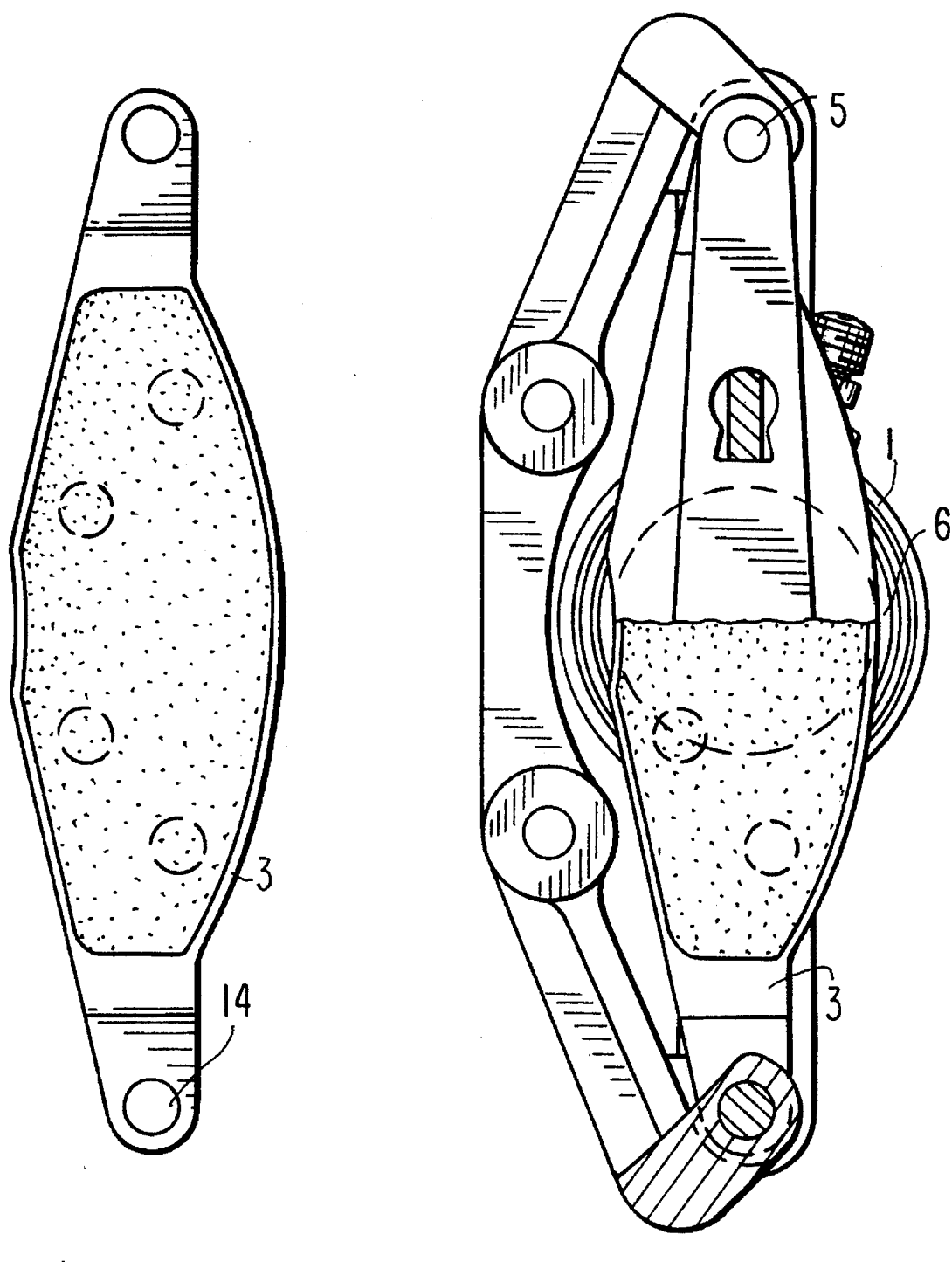
FIG. 3 is a side elevational view of the disk brake rear and inner pad.

The brake disc with reaction at the sliding pin includes:

A piston housing accompanying shape of a beam (1) in the flexion line, wherein the piston housing is made of cast iron or aluminum alloy, and a carrier which retained at the automobile axle with arms which form the central support (2), preferably in cast iron.

A removable inner pad (3), of molded friction material, is riveted or molded to a first pressed plate (3a) supported by sliding pins (5) on both sides, where the plate is obtained by conventional pressing, as there is no need of a fine blank finish, where the plate support area is provided through a hole 14 for the sliding pin (5).

An inner pad (4) has a support plate (4a) in beam shape (4a) and inner pad (4) accompanies the flexion line in cast iron, with a friction material molded in a conventional process, which is glued or riveted where the pad plate (4a) is a structural part, replacing a part of the main body, so that the support plate (4a) and the pad (4) form a single part bolted to the sliding pins, eliminating in this way, the bridge and the fingers of the conventional disc brake.

Two sliding pins (5) have the function of transferring the compression effort and of transmitting the braking effort, and also to permit the sliding and distribution of compression and braking efforts equally and symmetrically. Sliding pins (5) are supported on rubber shims mounted on the brake carrier, to avoid noise occurrence when the brake is subject to vibration in the off position.

The disc brake of the present invention also includes a piston (6), a boot (7) a seal (8), a boot (9) for protection of the sliding pins (12), pad return springs (10) and a bleeder (11). A lubricated bearing (12) isolates the carrier pin, to avoid noise, and supports the weight of the body when the brake is in the off position.

The functioning of the brake assembly as described herein, occurs as following:

The hydraulic fluid pressure generated in the vehicle's master cylinder is transmitted to the disc brake, which is installed in the vehicle wheel, and the pressure enters through the input feeding hole (13), in the piston housing, which exerts pressure on the piston area (6), transforming it into mechanic force, which is discharged on the inner pad (3), which in turn actuates on the brake disc, and at the same time such pressure exerts force on the piston housing (1) transmitted to the outer pad (4), through the sliding pins (5) that discharges the effort on the brake disc opposite path.

With the fixed bracket (2), the inner pad (3) is moved by the piston (6) and through the pins (5), through the moving of the body or housing (1), the outer pad is moved (4), thus compressing the disc; that occurs simultaneously.

The compression force (normal of the disc) is applied to the radial center of the disc braking path, which originates the braking force (tangential to the disc) of such force, which force is generated in the center line and at the same plane of the sliding pin (5) which is also the same plane of the normal force or compression force, thus eliminating the deflection moments occurring in the conventional brake.

The tangential braking force being transmitted to the carrier (2) central area is by the sliding pins (5), and simultaneously to both pins (5), equally dividing the efforts in relation to central line, independently of the pad wear condition.

The beam shape of the housing (1) and the outer pad (4) accompanies the flexion lines to uniform the loading of the pad along its length, providing for uniform wear of the friction material.

The pad return (3, 4) is provided by the spring action (10) assembled between the carrier (2) central area and the plates (3a), (4a) of pads (3, 4) and is placed on the sliding pins (5), thus minimizing the residual torque caused by the braking.

The configuration of this assembly of the disc brake simplifies the manufacturing of the disc brake, sensibly reducing the number of stages.

The piston housing (1) is not provided with either a bridge or pads brackets, therefore eliminating any milling operation.

The carrier (2) does not have a pads' bracket fingers, eliminating both broaching and milling of the disc passage area.

The piston housing (1) is machined on two axles only, making the operation of the machine extremely simple.

The fluid input port (13) and the fluid bleeder port (11) are symmetrically and identical located, thus eliminating the existence of a left or right hand machined part, as it can be turned on a lathe.

The pad plates (3a), (4a) for the pads (3), (4) and the carrier (2) are machined in one axle only; it can be made at a multispindle drilling machine.

The outer pad (4) is pressed in the conventional press and requires only drilling and threading.

The inner pad (3) is pressed in the conventional process and it has only one drilling.

In this way the specific project with special configuration of this disc brake with a reduced number of parts facilitates the assembling, maintenance and manufacturing operation, of the disc brake thus avoiding dimensional problems from simple manufacturing operations, as in the functioning, and residual torque, which causes several problems in the conventional disc brakes.

Therefore, owing to its novel features of innovation, functionability, practicability and easy manufacturing, assembling and maintenance, ability to meet the current requirements and trends of the automobile industry in the area of disc brakes with reaction at the sliding pins for automobile vehicles as herein described, the present invention provides a novel disc brake which achieves unexpected results of uniform application of force, thus providing for a reduced and uniform wear of the disc brake and pad material.

Other modifications may be made to the present invention, without departing from the spirit and scope of the present invention, as noted in the appended claims.

What is claimed is:

1. A reaction beam disc brake with sliding pins for a disc brake with a disc for automobile vehicles, wherein the disc brake has a reaction at the sliding pins for vehicles, which eliminates the residual torque and the bridge, fingers and half of the carrier, said disc brake comprising:

a housing (1) for a piston (6), said housing (1) being in a beam shape, a carrier (2) having two ends, said carrier being for mounting at the axle of the vehicle, said carrier having arms which form a central support (2), an internal pad (3) attachable to a pad plate (3a), an outer pad (4) in a beam shape, said outer pad (4) attachable to a pad plate (4a), a piston (6), a dust cover (7) for protection of each sliding pin, a plurality of pad return springs (10), a bleeder (11) a feeding inlet hole (13) for hydraulic fluid, and a bracket (12), wherein all brake reaction and action forces act in one single plane, said plane being the brake average plane which contains the center lines of said piston and said sliding pins, said pads being compressible on said brake disc with a braking clamping force causing braking tangential resultant force, wherein the tangential resultant force from the compression of said pads loads on said sliding pins, and is applied symmetrically by the compression of said inner and outer pads upon said disc of the disc brake, wherein said pads compress to form a braking force, said braking force being loaded on said support central area of said brake and through said sliding pins, said force being evenly distributed through said inner and said outer pads, or said two ends of said brake carrier, said resultant braking tangential force causing said pins to function to transmit effort and travel to said outer pad from said housing to which said pads are connected, said housing receiving the braking effort of said pads and transmitting the braking effort evenly to the two ends of said carrier, said pad plates transmitting efforts between said sliding pins independent of the application directing said two support ends of said carrier accommodating said pins having said springs, said springs (1) mountable axially on said sliding pins, said springs being compressed between said pad plate and said central area of the brake support, said springs urging said inner and said outer pads away from the rotor when the brakes are in an off position, wherein the occurrence of brake residual torque is avoided, a means for reduction of noise and for ventilation of the brake when the brake is vibrated to an off position, said means comprising said pad plate (4a) of said outer pad (4) being an integral structural part of the brake, said pad plate (4a) eliminating the need for a carrier bridge, said plate (4a) of said outer pad (4) being screwable and connectable to said sliding pins (5), said outer plate (4a) of said outer pad (4) being framed in a beam shape accompanying the flexion line for uniform distribution of the pressure all around said pad (4).

* * * * *